US009542116B2

(12) United States Patent
Thomas et al.

(10) Patent No.: US 9,542,116 B2
(45) Date of Patent: Jan. 10, 2017

(54) DIRECT ATTACHED STORAGE SYSTEM AND METHOD FOR IMPLEMENTING MULTIPLE SIMULTANEOUS STORAGE SCHEMES

(75) Inventors: Fred Charles Thomas, Fort Collins, CO (US); Phillip M. Walker, Fort Collins, CO (US); Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1460 days.

(21) Appl. No.: 13/054,610

(22) PCT Filed: Oct. 23, 2008

(86) PCT No.: PCT/US2008/081023
§ 371 (c)(1),
(2), (4) Date: Jan. 18, 2011

(87) PCT Pub. No.: WO2010/047710
PCT Pub. Date: Apr. 29, 2010

(65) Prior Publication Data
US 2011/0125965 A1     May 26, 2011

(51) Int. Cl.
*G06F 12/00* (2006.01)
*G06F 3/06* (2006.01)
(52) U.S. Cl.
CPC .......... *G06F 3/0632* (2013.01); *G06F 3/0605* (2013.01); *G06F 3/0676* (2013.01); *G06F 3/0689* (2013.01)
(58) Field of Classification Search
USPC ................................................ 711/114, 154
See application file for complete search history.

(56) References Cited

U.S. PATENT DOCUMENTS

| 5,568,629 A  * | 10/1996 | Gentry et al. ................ 711/114 |
| 8,131,926 B2 * | 3/2012 | Lubbers et al. .............. 711/114 |
| 8,255,803 B1 * | 8/2012 | McAdam .............. G06F 3/0605 |
| | | 711/114 |

(Continued)

FOREIGN PATENT DOCUMENTS

| CN | 1445675 | 10/2003 |
| WO | WO-2005124504 A1 | 12/2005 |

OTHER PUBLICATIONS

Thomas, Fred Charles, et al; Notification of Transmittal of the International Search Report and the Written Opinion of the International Searching Authority, or the Declaration; dated Jul. 3, 2009, cited in corresponding PCT Application Serial No. PCT/US2008/081023 flied Oct. 23, 2008; 11 pages.

(Continued)

*Primary Examiner* — John A Lane
(74) *Attorney, Agent, or Firm* — HP Inc. Patent Department

(57) ABSTRACT

A direct attached storage (DAS) system configurable to simultaneously implement a plurality of data storage schemes, comprising one or more storage devices, a controller coupled to the storage devices for implementing and managing a plurality of data storage schemes on the storage devices, an I/O port for inputting data to and outputting data from the storage devices, and an apportionment selector coupled to the controller for selecting a portion of the storage devices to be allocated to a determined data storage scheme.

20 Claims, 2 Drawing Sheets

(56) References Cited

U.S. PATENT DOCUMENTS

| | | | |
|---|---|---|---|
| 2005/0268036 A1* | 12/2005 | Kinnan | G06F 3/0605 |
| | | | 711/114 |
| 2006/0085593 A1 | 4/2006 | Lubbers et al. | |
| 2006/0150012 A1 | 7/2006 | Hosokawa et al. | |
| 2008/0126734 A1 | 5/2008 | Murase | |
| 2008/0168209 A1 | 7/2008 | Davison | |
| 2008/0235449 A1 | 9/2008 | Hyde et al. | |
| 2012/0265926 A1* | 10/2012 | Tal et al. | 711/103 |

OTHER PUBLICATIONS

People's Republic of China, Search Report dated May 14, 2013, Application No. 200880131321.8, Filed Oct. 23, 2008, 2 pages, English.

* cited by examiner

DIRECT ATTACHED STORAGE SYSTEM AND METHOD FOR IMPLEMENTING MULTIPLE SIMULTANEOUS STORAGE SCHEMES

BACKGROUND

Products such as personal video recorders (PVRs), game consoles and the like whose operation entails processing data often include internal data storage, such as an internal hard disk drive (HDD). In addition, such products often have a data port for attaching an external direct-attached storage (DAS) system to increase the data storage capacity of the product. Such a data port is typically a universal serial bus (USB) port, an external serial advanced technology attachment (eSATA) port, or an IEEE 1394 (Firewire) port. The DAS system can include a disk enclosure containing one or more hard disk drives (HDDs).

Typically, there is no user interface provided with the PVR or other product to which the DAS system is attached to configure the DAS system. Therefore, such DAS systems are generally configured for a particular non-varying data storage scheme. For example, the storage assets of a DAS system might comprise two HDDs configured as a single concatenated volume. Such a configuration does not provide data protection in the event of a failure of one of the drives, and if one of the drives fails data will be lost. Alternatively, the two HDDs might be configured as mirrored disks, which provides data protection, and if one of the drives fails data will not be lost.

DAS storage expansion systems exist that can support and can be configured and/or reconfigured to implement one of various storage schemes, such as a single or nested RAID ("Redundant Array of Independent (or Inexpensive) Disks") mode (0, 1, 5, 10 etc.), JBOD ("just a bunch of disks") or Big/Concatenated single volume configuration. Some such DAS systems include a hardware mechanism for selecting the particular storage scheme the product will implement, such as a DIP switch or rotational switch.

However, if a user wants to apportion the storage assets of a DAS storage expansion system to simultaneously use more than one storage scheme, there is presently no product with a hardware mechanism directly on the product that provides this capability. For example, using existing DAS systems, there is no way a user can apportion 30% of the storage assets in the system to a protected mode (such as RAID 1 or RAID 5) and 70% of the storage to a single concatenated volume, using mechanism provided on the DAS system. Thus, there is a need for a DAS system that can be configured and/or reconfigured via a hardware mechanism on the DAS system to simultaneously implement more than one data storage scheme.

SUMMARY

A direct attached storage (DAS) system configurable to simultaneously implement a plurality of data storage schemes, comprising one or more storage devices, a controller coupled to the storage devices for implementing and managing a plurality of data storage schemes on the storage devices, an I/O port for inputting data to and outputting data from the storage devices, and an apportionment selector coupled to the controller for selecting a portion of the storage devices to be allocated to a determined data storage scheme.

It is to be understood that both the foregoing general description and the following detailed description are exemplary and explanatory and are intended to provide further explanation of the claims.

BRIEF DESCRIPTION OF THE DRAWINGS

The accompanying drawings, which are included to provide a further understanding of the disclosed systems and methods and are incorporated in and constitute a part of this specification, illustrate embodiments of the disclosed systems and methods and together with the description serve to explain but not limit the principles of the disclosed systems and methods as claimed.

In the drawings.

DETAILED DESCRIPTION

Reference will now be made in detail to various embodiments of the disclosed system, one example of which is illustrated in the accompanying drawings.

Figure 1:
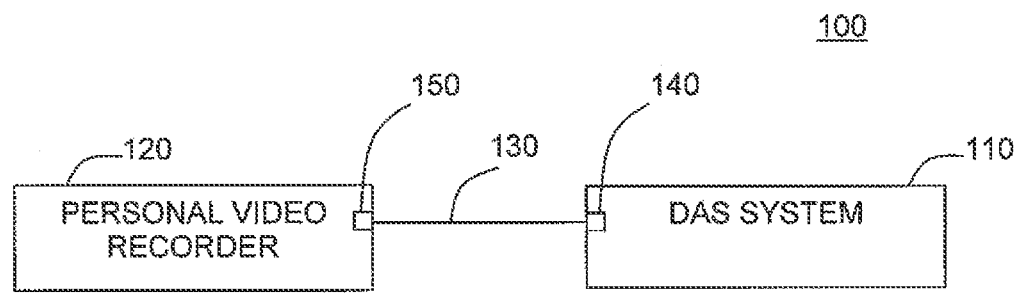
FIG. 1 is a block diagram showing a direct attached storage (DAS) system attached to a PVR.

Referring now to FIG. 1, shown is an exemplary arrangement 100 for adding a direct attached storage (DAS) system to a product that processes data. Here, the data processing product is a personal video recorder (PVR), although other types of products can be used, such as game consoles, personal computers, and the like. As shown, DAS system 110 is directly attached to the personal video recorder (PVR) 120 via cable 130. One end of the cable is attached to DAS I/O port 150 on the PVR and the other end is attached to a DAS I/O port 140 on the DAS system. The DAS I/O ports may be universal serial bus (USB) ports, external serial advanced technology attachment (eSATA) ports, or IEEE 1394 (Firewire) ports, although other types of wired or wireless connections can be used.

Figure 2:
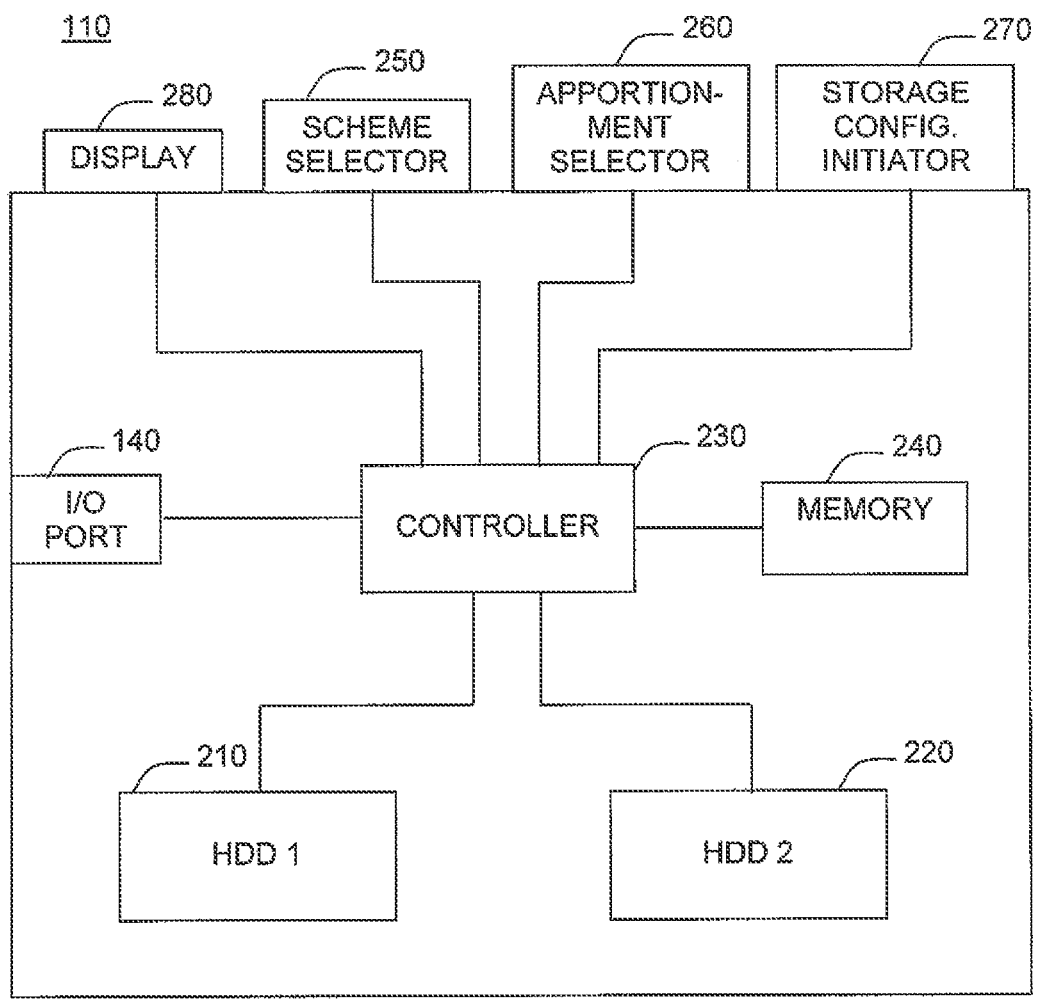
FIG. 2 is a block diagram of a DAS system in accordance with a herein disclosed embodiment.

Referring to FIG. 2, shown is a block diagram of exemplary DAS system 110. The storage assets of the DAS system 110 include two hard disk drives (HDDs) 210 and 220. Although hard drives are shown, any type of readable/writable non-volatile random access storage assets can be used, such as flash memory, recordable optical drives, or the like. In addition, although two storage devices are shown, any number of storage devices can be used on which two or more data storage schemes can be implemented.

In FIG. 2, components of DAS system 110 intercommunicate via communication paths, indicated by single lines for simplicity of presentation. A communication path can comprise a single wire or a plurality of wires. Other types of communication paths can also be used such as parallel or serial communication busses, fiber optic paths, wireless communication paths, or the like.

Data is input to and output from DAS system 110 via I/O port 140. As noted, I/O port 140 may be a universal serial bus (USB) port, an external serial advanced technology attachment (eSATA) port, an IEEE 1394 (Firewire) port, or the like, although other types of wired or wireless connections can be used. Data to be stored on the HDDs 210, 220 is received at port 140 from PVR 120. In addition, requests for data stored on HDDs 210, 220 can be received from the PVR 120 via port 140, and data can also be sent from the DAS system 110 to the PVR 120 via port 140. Controller 230 manages data storage and retrieval in accordance with predetermined and/or selected data storage schemes and storage rules, as will be described hereinafter.

Two or more data storage schemes can be implemented on HDDs 210, 220. The data storage schemes can be predetermined, for example, they can comprise default storage scheme and apportionment values stored in a non-volatile storage device such as memory 240. In an embodiment, one or more of the data storage schemes can be selected by the user using storage scheme selector 250. The storage scheme selector 250 can be any type of physical selector that can be located on the DAS system 110 and communicate the selection to the controller 230, such as an electromechanical or electronic device. Examples of selectors include one or more thumb wheels, DIP switches, buttons with LCD screen having on-screen display, and the like.

The portion of HDDs 210, 220 to be configured using a predetermined or selected data storage scheme can be selected using apportionment selector 260. The apportionment selector 260 can be any type of physical selector able to indicate an apportionment selection, that can be located on the DAS system 110 and communicate the selection to the controller 230. Examples of selectors include one or more thumb wheels, DIP switches, buttons with LCD screen having on-screen display, potentiometer dial, or the like.

In an embodiment, the storage scheme selector 250 and the apportionment selector 260 can share some or all of the same selector elements, such as a thumbwheel or a DIP switch, and a separate selector such as a toggle switch (not shown) can be used to choose which of the scheme or the apportionment is being selected. In another embodiment, controller 230 can be adapted to implement one or more default data storage schemes and/or apportionment values. In an embodiment, the default values can be stored in memory 240. For example, a DAS system 110 can be configured to provide a default protected first data storage scheme (e.g., RAID 1 for two hard drives or RAID 5 for more than two hard drives), and a default unprotected data storage scheme (e.g., a single concatenated volume). The user can then select only the portion of storage assets to be apportioned to each default storage scheme. In an implementation, the user can select only the portion of storage assets to be apportioned to one of two default storage schemes, such as the default protected scheme, and the remaining portion of storage assets can be apportioned to the other scheme by default, such as the unprotected storage scheme.

The selected scheme selector setting and apportionment selector setting, and/or default scheme and/or apportionment values, are communicated to the controller, which implements the communicated settings by apportioning HDDs 210, 220 in accordance with the communicated settings. Information of default settings, such as default storage schemes as previously described, can be stored in a computer readable storage medium such as memory 240, and obtained by controller 230 as needed to implement a determined configuration. A storage configuration initiator 270 can be provided to initiate configuring the storage assets of the DAS system 110 in accordance with the determined schemes and apportionment. Preferably, the configuration initiator 270 is of a type that cannot easily be accidentally activated. For example, the configuration initiator 270 can comprise a button that is accessed through a small hole and can only be depressed by inserting a long thin sturdy object into the hole, such as the end of an unbent paper clip.

A display 280 located on the DAS system 110 can display storage scheme information of the HDDs 210, 220. Such information can pertain to an implemented storage configuration. For example, the display 280 can indicate one or more of: the storage schemes that have been implemented; the proportion of the storage assets that are configured with one or more of the implemented schemes; the portion of an implemented scheme that has been used to store data, and the like. Alternatively, the information can pertain to a selected but not yet implemented storage configuration, such as when reconfiguring a previously configured DAS system 110. For example, the display 280 can indicate whether a selected but not yet implemented storage configuration or reconfiguration can actually be implemented, and/or whether the schemes can be implemented without losing data that has already been stored in an already implemented data storage configuration. The display 280 can comprise one or more light emitting diodes (LEDs), liquid crystal displays (LCDs), bistable displays such as electrophoretic displays (EPDs) such as E Ink, electronic dial gauges, and the like.

Thus, controller 230 can receive the selected apportionment from the apportionment selector 260, and the data storage schemes to be implemented from the selector 250 and/or memory 240. The controller 230 can also provide to the display 280 storage scheme information for display thereon, based on the status of the HDDs 210, 220 and/or the status of the selectors 250, 260. The controller 230 can implement and manage the HDDs 210, 220 in accordance with the selected or default data storage schemes and selected or default apportionment. The controller 230 then receives input data from the I/O port 140 and provides it to the HDDs 210, 220 in accordance with the implemented storage schemes and apportionment. In addition, the controller 230 receives requests for stored data from the I/O port 140. The controller 230 retrieves data from the HDDs 210, 220 and provides it to the I/O port 140. For example, the controller 230 can receive a request for data via the I/O port 140, retrieve the requested data from the HDDs 210, 220, and provide the retrieved data to the I/O port 140.

The controller 230 can comprise one or more microprocessors, interfaces, memories, and other electronics, to accomplish the abstraction of logical storage entities from the HDDs 210, 220 of the DAS system 110, to implement the selected and/or default storage schemes and apportionment, and to manage the storage. It is appreciated that this storage abstraction and management can be accomplished in any known manner.

In addition, the controller 230 can manage the storage in accordance with one or more storage rules stored in a computer readable storage medium, such as in memory 240. For example, a storage rule might require that data received via the I/O port 140 be stored in a protected storage area for a predetermined period of time, or until the protected storage area is full, after which the stored data can be migrated to a non-protected storage area. Another storage rule can require that when a non-protected storage area is full, the data first stored therein can be deleted as needed to store data being migrated thereto from a protected storage area.

In an embodiment, the controller 230 can provide an allowed-storage-state filter function. The allowed-storage-state filter function can communicate to the user, such as via display 280 in conjunction with the apportionment selector 260 and/or scheme selector 250, the allocation combinations of storage schemes that may be transitioned to, depending on the amount of storage already being used to store data and the amount of storage still available for storing additional data. For example, the controller 230 can disallow the HDDs 210, 220 from being transitioned to a new storage allocation scheme that cannot be implemented without loss of data already stored on the HHDs. For example, if the DAS system 110 is initially configured to have 50% of its storage assets allocated to a RAID scheme and 50% to a single concatenated volume, and the single concatenated volume is nearly at full storage capacity, then the user can be precluded from changing the allocation to a greater percentage of the RAID storage scheme because the new allocation cannot be implemented without losing data already stored in the concatenated volume. Conversely, if there is unused RAID storage space, the controller 230 can allow reducing the amount of storage allocated for the RAID storage and increasing the allocation for the single concatenated volume storage, because that configuration can be implemented without losing any data already stored in the RAID storage.

In another embodiment, storage rules stored in memory 240 can provide instructions to the controller 230 to determine which portion of the storage (such as protected or unprotected storage) incoming data should be stored in, based on information about the data, such as data file contents, a file header, file metadata, or the like.

Figure 3:
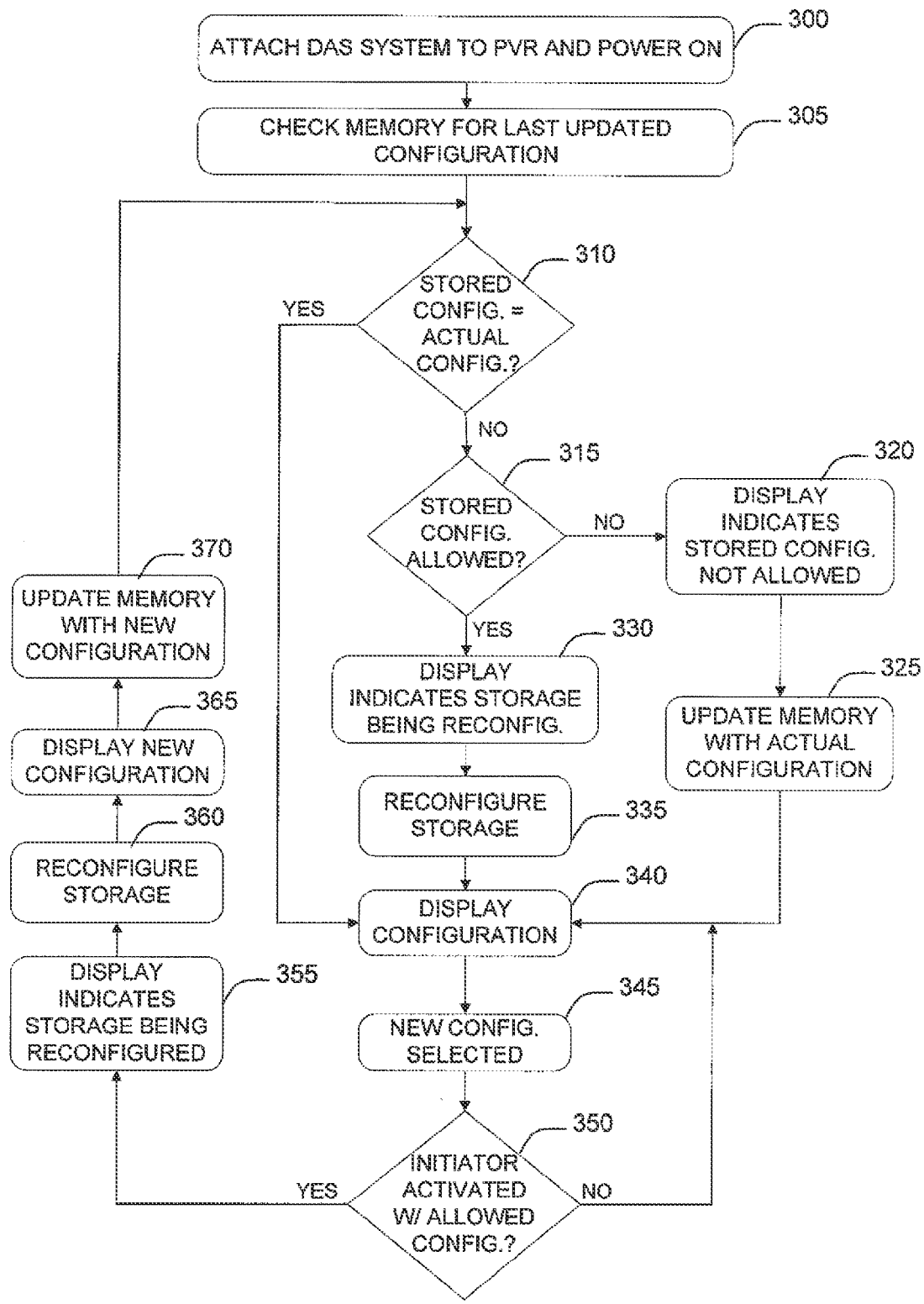
FIG. 3 is a flow diagram showing operation of a system in accordance with a herein disclosed embodiment.

FIG. 3 is a flow diagram showing the exemplary operation of a DAS system 110 such as the DAS system of FIG. 2, for implementing multiple simultaneous storage schemes. Processing begins at block 300 where the DAS system 110 is attached to a PVR 120 or other device able to access an external DAS device, and DAS system 110 is powered on. From there, processing proceeds to block 305, where a non-volatile data storage device, such as at least a portion of memory 240, is checked for a stored storage configuration, such as the last updated storage configuration, comprising one or more selected and/or default storage schemes and their respective apportionments. The stored configuration information from memory 240 is compared at block 310 with the actual currently implemented configuration information obtained from the storage assets, such as HDDs 210, 220, to determine if the stored configuration matches the actual configuration. If the stored configuration does match the actual configuration, processing proceeds to block 340 and proceeds from there. However, if the stored configuration does not match the actual configuration, it is determined if the stored configuration is an allowed configuration at block 315. For example, an allowed configuration can be a configuration that can be implemented without the loss of data already stored in the storage assets as actually configured, although one or more other rules, such as rules stored in memory 240, can be used to determine whether the stored configuration is allowed. For example, a rule may permit data having certain predetermined characteristics to be deleted when reconfiguring the storage assets, such as files of a certain type or age.

If the stored configuration is allowed, processing proceeds to block 330 and proceeds from there. However, if the stored configuration is not allowed, processing proceeds to block 320 where display 280 can indicate that the storage assets cannot be reconfigured to the stored scheme. In an implementation, the indication can be displayed for a predetermined amount of time, such as five minutes, or can persist until a new scheme or apportionment is implemented or selected using scheme selector 250 and/or apportionment selector 260. From there, processing proceeds to block 325, where the memory 240 is updated with the actual configuration information. Processing proceeds to block 340, where display 280 displays information of the actual storage configuration.

If at block 315 it is determined that the stored configuration is allowed, the display can indicate at block 330 that the storage assets are being reconfigured. Processing proceeds to block 335, where the storage assets are reconfigured. When configuration is complete, the display 280 can display information of the implemented configuration, block 340.

From there, processing proceeds to block 345, where it is determined if new configuration settings have been selected, such as by using apportionment selector 260 and/or scheme selector 250, as hereinbefore described. If so, controller 230 determines if the newly selected configuration is allowed, such as in accordance with storage rules stored in memory 240, and the display 280 can indicate whether or not the selected configuration is allowed. Processing proceeds to block 350, where a it is determined if the storage configuration initiator 270 has been activated in conjunction with an allowed configuration. If not, no change to the storage configuration is implemented, and processing reverts back to the input of block 340.

However, if at block 350 storage configuration initiator 270 has been activated in conjunction with an allowed configuration, processing proceeds to block 355, where display 280 indicates the storage assets are being reconfigured. From there, the storage assets are reconfigured at block 360 in accordance with the setting of the apportionment selector 260 and/or scheme selector 250. When reconfiguration is complete, information of the newly implemented configuration is displayed at block 365 on display 280, and memory 240 is updated with information of the new storage configuration, including the implemented storage schemes and apportionment. Processing then reverts to the input of block 310 and proceeds from there.

Although shown in conjunction with particular elements, such as controller 230 and memory 240 of FIG. 2, the logic, file system parameters, drivers, and the like used to implement the herein described systems and methods can reside elsewhere in the DAS system 110. Moreover, the logic, file system parameters, drivers and the like can comprise computer readable instructions stored in a computer readable storage medium that when executed in a processor, such as a processor of controller 230 (not shown), cause the DAS system 110 to perform the herein described operations.

Various modifications and variations can be made to the disclosed systems and methods without departing from the spirit or scope of the disclosed systems and methods. Thus, it is intended that the appended claims cover the modifications and variations of the disclosed systems and methods provided they come within the scope of the claims and their equivalents.

What is claimed is:

1. A direct attached storage (DAS) system configurable to simultaneously implement a plurality of data storage schemes, comprising:
   one or more storage devices;
   a controller coupled to the storage devices for implementing and managing a plurality of data storage schemes on the storage devices;
   a data input/output (I/O) port coupled to the controller for inputting data to and outputting data from the storage devices; and
   an apportionment selector coupled to the controller for selecting a portion of the storage devices to be allocated to a determined data storage scheme.

2. The system of claim 1, further comprising a storage configuration initiator coupled to the controller for initiating a storage configuration comprising the determined storage scheme and selected apportionment.

3. The system of claim 2, wherein the storage configuration initiator includes a recessed button.

4. The system of claim 1, further comprising:
a scheme selector coupled to the controller for selecting at least one of said plurality of data storage schemes.

5. The system of claim 4, wherein the scheme selector and the apportionment selector share at least one element.

6. The system of claim 1, wherein each of the data storage schemes is one of a group consisting of a partition, a standard RAID (Redundant Array of Independent (or Inexpensive) Disks) level, a nested RAID level, a concatenated volume, and a JBOD (just a bunch of drives) configuration.

7. The system of claim 1, wherein the I/O port includes a universal serial bus (USB) port, an external Serial Advanced Technology Attachment (eSATA) port, or an IEEE 1394 port.

8. The system of claim 1, further comprising a display coupled to the controller for displaying storage scheme information of the storage devices.

9. The system of claim 8, wherein the storage scheme information includes at least one of an indication of an implemented data storage scheme, an indication of a portion of the storage devices allocated to the implemented scheme, and an indication of whether a selected but not implemented scheme is allowed.

10. The system of claim 9, wherein the selected but not implemented scheme is allowed in the case that data already stored on the storage devices will not be lost if the selected scheme is implemented.

11. The system of claim 8, wherein the display comprises at least one of a light emitting diode (LED), a liquid crystal display (LCD), an electrophoretic display, and a dial gauge.

12. The system of claim 1, wherein the apportionment selector includes at least one of a thumb wheel, a dual inline package (DIP) switch, a potentiometer dial, and a push button.

13. The system of claim 1, wherein the controller is adapted to store data in the storage devices in accordance with at least one data storage rule.

14. The system of claim 13, wherein the data storage rule includes moving data from a first portion of the storage devices configured to use a first data storage scheme to a second portion of the storage devices configured to use a second data storage scheme based on at least one of the time the data was stored in the first portion and the unused storage capacity of the first portion.

15. The system of claim 13, wherein the data storage rule includes storing data in a determined allocated portion of the storage devices based on information about the data.

16. A method for simultaneously implementing a plurality of data storage schemes in a direct attached storage (DAS) system, comprising:
determining at least one data storage scheme;
using a physical selector to select at least a portion of one or more storage devices of the DAS system to be allocated to the determined scheme; and
implementing a plurality of data storage schemes on said storage devices, including the determined storage scheme on the selected portion of the storage devices.

17. The method of claim 16, wherein at least two of the data storage schemes are each from a group consisting of a partition, a standard RAID (Redundant Array of Independent (or Inexpensive) Disks) level, a nested RAID level, a concatenated volume, and a JBOD (just a bunch of drives) configuration.

18. The method of claim 16, further comprising:
displaying storage scheme information of the storage devices.

19. The method of claim 16, further comprising:
using a physical selector to select a new portion of the storage devices to be allocated to the determined scheme;
determining whether the selected new allocation is allowed to be implemented; and
in the case the new allocation is allowed, implementing the new allocation.

20. The method of claim 19, wherein the new allocation is allowed if it can be implemented without losing data already stored on the storage devices.

* * * * *